United States Patent Office 3,057,644
Patented Oct. 9, 1962

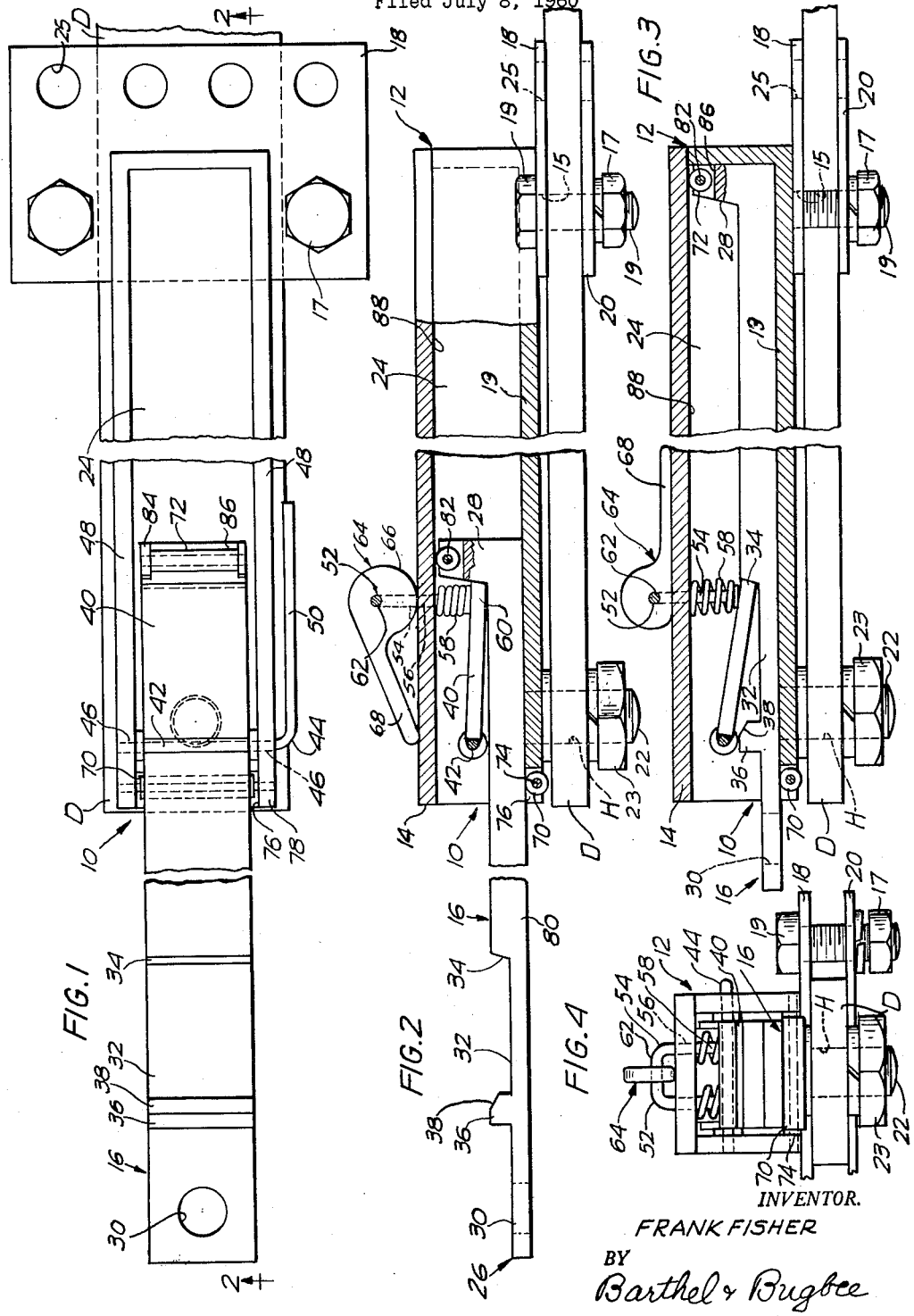

3,057,644
TELESCOPING TRACTOR-TRAILER HITCH
Frank Fisher, Rte. 3, Box 447, Owosso, Mich.
Filed July 8, 1960, Ser. No. 41,565
5 Claims. (Cl. 280—478)

This invention relates to tractor-trailer combinations and, in particular, to tractor-trailer hitches for coupling a trailer, such as an agricultural implement, to the draft bar of a tractor.

One object of this invention is to provide a telescoping tractor-trailer hitch adapted to be mounted on the draft bar of a tractor for the purpose of simplifying the coupling operation of the tractor to the trailer by eliminating the previously-required repeated maneuvering of the tractor and dismounting of the operator until the holes in the draft bar of the tractor and tongue of the trailer come into sufficient alignment for the insertion of a coupling pin.

Another object is to provide a telescoping tractor-trailer hitch of the foregoing character wherein the hitch consists of an elongated casing bolted or otherwise secured to the tractor draft bar and an extensible and retractible auxiliary draft bar reciprocably mounted within the casing and having a hole for the insertion of the coupling pin and a releasable latch for locking the auxiliary draft bar in its retracted position within the casing in order permit towing after the coupling operation has been completed.

Another object is to provide a telescoping tractor-trailer hitch of the foregoing character wherein the latch also serves as a fixed stop engageable with a movable rearward stop portion near the rearward end of the auxiliary draft bar for limiting the extension of the latter prior to coupling.

Another object is to provide a telescoping tractor-trailer hitch of the foregoing character wherein the auxiliary draft bar near its forward end has an additional forward stop shoulder engageable with the latch to releasably lock the draft bar in its retracted position.

Other objects and advantages of the invention will become apparent during the course of the following description of the accompanying drawing, wherein:

FIGURE 1 is a top plan view of one form of the telescoping tractor-trailer hitch, according to the invention, with the auxiliary draft bar in its extended position for coupling, with the cover plate removed to discloses the internal construction and with the middle portion omitted to conserve space and increase the scale of illustration;

FIGURE 2 is a vertical section taken along the line 2—2 in FIGURE 1, with the moving parts mainly in side elevation with the middle portion similarly omitted;

FIGURE 3 is a vertical section similar to FIGURE 2, but with the auxiliary draft bar in its retracted position for towing, with the middle portion similarly omitted; and FIGURE 4 is a left-hand end elevation of the tractor-trailer hitch shown in FIGURES 1, 2 and 3.

Hitherto, the operator of a tractor seeking to couple his tractor to the coupling tongue of a trailer, such as an agricultural implement, has been required to perform a number of time-consuming operations before coupling has been accomplished. Previously the tractor operator has had to back the tractor as close as he can judge to the coupling tongue of the implement, such as a plow or disc harrow, and then to dismount to inspect its condition of alignment for coupling. If the draft bar of the tractor is not sufficiently close for alignment with the coupling tongue of the trailer or other implement, the operator has had to remount the tractor and repeat these operations, moving the tractor backward or forward until the coupling hole in the draft bar of the tractor is aligned with the coupling hole in the tongue of the implement. When he at last has been successful in moving the coupling holes into alignment in this manner, he inserts the coupling pin therein, remounts his tractor and drives it forward, towing the implement and thus causing it to perform its intended work. The present invention provides a telescoping tractor-trailer hitch which eliminates the need for this repeated dismounting and remounting for the making of such inspection and adjustments and enables the operator to ordinarily perform the coupling of the tractor to the trailer in a short and rapid operation, as set forth in the above-stated objects of the invention.

Referring to the drawing in detail, FIGURES 1 and 2 show a telescoping tractor-trailer hitch, generally designated 10, according to one from of the invention as consisting generally of an elongated channel-shaped casing 12 open at one end and having a bottom wall 13. The casing 12 is closed at its top by a cover plate 14 (omitted from FIGURE 1), bolted or otherwise secured thereto and containing a relatively-slidable auxiliary draft bar 16. The casing 12 is secured to the rearward end of the tractor bar D by nuts 17 on a pair of bolts 19 extending through holes 15 in a cross plate 18, which in turn is welded or otherwise secured to the bottom wall 19 of the casing 12. The cross plate 18 and bolts 19 straddle the tractor draft bar D (FIGURE 4) and are clamped thereto by a clamping plate 20 drilled in alignment with the cross plate 18 for the reception of the bolts 19. The cross plate 18 has other bolt holes 25 to fit other types of tractor draft bars. Welded or otherwise secured to the bottom wall 13 of the casing 12 near its open end is the upper end of a stud 22 which extends downward through the coupling hole H in the free end of the draw bar D and is held in position by a nut 23.

The auxiliary draft bar 16 is slidably mounted in the elongated rectangular chamber 24 within the casing 12 along the bottom wall 13 thereof. The auxiliary draft bar 16 at its inner end has an upstanding integral stop portion 28 and at its outer end 26 a coupling hole 30 for alignment with the corresponding coupling hole in the tongue of the implement of other trailer (not shown) for insertion of a conventional coupling pin (also not shown). The auxiliary draft bar 16 behind the coupling hole 30 has a latch recess 32 therein between a latching shoulder or keeper 34 and an upstanding rib 36 with an inclined top cam portion or face 38 adjacent the recess 32 adapted to push the draft bar 16 downward if the cam portion 38 engages a cross rod 42 mounted above it. The recess 32 is adapted to receive a swinging latch block 40 of approximately rectangular shape welded or otherwise secured to the cross rod 42 of the L-shaped operating rod 44 which in turn is pivotally mounted in aligned holes 46 in the opposite casing side walls 48. The other or external arm 50 of the L-shaped rod 44 serves as a latch-operating handle.

The latch block 40 is yieldingly urged downward toward the auxiliary draft bar 16 by an inverted U-shaped bail 52, the opposite arms 54 of which are vertically slidably mounted in laterally-spaced holes 56 in the cover plate 14. Mounted on the lower ends of the vertical arms 54 beneath the cover plate 14 are compression springs 58, the lower ends of which are connected to the lower ends of the arms 54. The springs 58 urge the arms 54 downward against the latch block 40 at a location remote from the pivot rod 42 so as to urge the free end 60 of the latch block 40 into the path either of the upstanding stop portion 28 or recess shoulder 34 of the auxiliary draft bar 16, according to the position of the latter, either as extended (FIGURE 2) or retracted (FIGURE 3).

To temporarily remove the thrust of the springs 58 from the latch block 40, the U-shaped bail 52 may be raised manually by the fingers or by the insertion of a screw driver beneath the bridge portion 62 thereof. For convenience, however, there is provided for this purpose a manually-operable spring retractor or cam lever 64 having an eccentric cam portion 66 drilled eccentrically and rotatably mounted on the bridge portion 62. A handle 68 extending approximately tangentially from the eccentric cam portion 66 enables rotation of the latter from an inoperative position, shown in FIGURE 3, permitting full thrust of the springs 58, to its operative position shown in FIGURE 2 with the handle 68 rotated 180 degrees counterclockwise to the inoperative position shown in FIGURE 3.

To facilitate free sliding motion of the auxiliary draft bar 16 and to reduce friction between it and the casing 12, a pair of contact rollers 70 and 72 are provided. The contact roller 70 is mounted on an axle 74 spanning a notch 76 in the free end of the bottom wall 13, with the opposite ends of the axle 74 seated in the projecting portions 78 which are suitably drilled in alignment for that purpose, so that the periphery of the roller 70 projects slightly above the top surface of the bottom wall 19 of the casing 12, thus engaging the bottom surface 80 of the auxiliary draft bar 16. The other roller 72 is similarly mounted on an axle 82 with its opposite ends seated in the suitably drilled upstanding lugs 84 formed by a notch 86 cut into the upper end of the stop projection 28 on the inner end of the auxiliary draft bar 16 so that the periphery of the roller 72 rotatably engages the bottom surface 88 of the cover plate 14 (FIGURES 2 and 3).

In the operation of the invention, with the cam lever 64 in its inoperative position of FIGURE 3 and with the parts in their retracted positions of FIGURE 3, the tractor operator backs his tractor into position wherein he estimates that the coupling hole 30 in the auxiliary draft bar 16 is located as nearly as possible in alignment with the coupling hole in the tongue (not shown) of the agricultural implement or other trailer or towed device. He then dismounts from his tractor to inspect the actual condition of alignment. If the coupling holes are not in alignment, as is usually the case, he temporarily removes the thrust of the springs 58 from the latch block 40 by swinging the handle 68 of the cam lever 64 counterclockwise 180 degrees to the left of its inoperative position shown in FIGURE 3 to its operative position shown in FIGURE 2, raising the V-shaped bail 52. He then pulls upward on the handle 50 to swing the latch block 40 counterclockwise in an upward direction so that its end 60 moves out of engagement with the stop shoulder 34. He then grasps the projecting end of the auxiliary draft bar 16 and draws it outward until its coupling hole 30 is aligned with the coupling hole in the tongue of the implement, whereupon be inserts the coupling pin. The parts are now in the extended positions shown in FIGURES 1 and 2. The operator now moves the handle 68 of the cam lever 64 clockwise 180 degrees to the right back into its inoperative position shown in FIGURE 3, in order to lower the U-shaped bail 52 and thereby to re-apply the thrust of the springs 58 to the latch block 40.

To resume the towing position, the operator remounts the tractor and backs it in such a manner that the casing 12 moves relatively to the auxiliary draft bar 16 which by reason of its being coupled to the implement remains stationary, until the end 60 of the latch block 40 drops into the latching recess 32 and engages the locking shoulder 34. The operator then operates the tractor in the usual way to tow the implement and perform its intended work while the auxiliary draft bar 16 is thus locked in its retracted position of FIGURE 3 by the latch block 40 engaging the locking shoulder 34.

What I claim is:
1. A telescoping tractor-trailer hitch, comprising
   an elongated hollow casing structure adapted to be attached to the draft bar of a tractor,
   an elongated auxiliary draft bar slidably mounted in said casing structure in telescoping relationship therewith and having an outer end with a coupling hole therein adapted to be aligned with a coupling hole in the coupling tongue of a trailer,
      said auxiliary draft bar having thereon an inner stop shoulder disposed near the inner end thereof within said casing structure,
      said auxiliary draft bar having thereon an outer stop shoulder disposed near the outer end thereof in longitudinally-spaced relationship with said inner stop shoulder,
   a pivot element mounted in said casing structure in transversely-disposed relationship therewith,
   a latch member mounted on said pivot element and selectively movable into and out of latching engagement with said outer stop shoulder in the retracted position of said auxiliary draft bar and with said inner stop shoulder in the extended position of said auxiliary draft bar,
   means for so moving said latch member,
   resilient means mounted on said casing structure in yielding engagement with said latch member and normally urging said latch member into latching engagement with a selected stop shoulder,
   and a resilient means retractor movably mounted on said casing structure for motion selectively into and out of retracting engagement with said resilient means and respectively effecting application and removal of yielding force relatively to said latch member.

2. A telescoping tractor-trailer hitch, according to claim 1, wherein the retractor includes a cam operatively connected to the resilient means and a cam mover operatively connected to the cam.

3. A telescoping tractor-trailer hitch, according to claim 1, wherein the resilient means includes a U-shaped member slidably mounted in said casing structure and springs mounted on said U-shaped member.

4. A telescoping tractor-trailer hitch, according to claim 3, wherein a spring retractor is movably mounted adjacent said U-shaped member in engagement therewith and wherein means is provided for moving said spring retractor.

5. A telescoping tractor-trailer hitch, according to claim 3, wherein a spring-retracting cam is rotatably mounted on said U-shaped member and wherein means is provided for rotating said cam.

References Cited in the file of this patent
UNITED STATES PATENTS

| | | |
|---|---|---|
| 2,484,751 | Schultz | Oct. 11, 1949 |
| 2,507,799 | McNair | May 16, 1950 |
| 2,818,276 | Sprang | Dec. 31, 1957 |
| 2,820,649 | Demarest | Jan. 21, 1958 |
| 2,871,029 | Demarest | Jan. 27, 1959 |